United States Patent [19]

Davlantes

[11] 4,440,518

[45] Apr. 3, 1984

[54] TUBING COUPLING

[76] Inventor: George N. Davlantes, 7844 Gazette Ave., Canoga Park, Calif. 91306

[21] Appl. No.: 315,168

[22] Filed: Oct. 26, 1981

[51] Int. Cl.³ .............................................. F16B 7/04
[52] U.S. Cl. ................................................... 403/297
[58] Field of Search ....................................... 403/297

[56] References Cited

U.S. PATENT DOCUMENTS

| | | | |
|---|---|---|---|
| 2,844,234 | 7/1958 | Brandes | 403/297 |
| 2,850,304 | 9/1958 | Wagner | 285/397 |
| 3,304,108 | 2/1967 | Hamilton et al. | 287/189.36 |
| 3,484,830 | 12/1969 | Wagner et al. | 285/397 |
| 3,736,009 | 5/1973 | Juhnke | 287/54 C |
| 3,822,101 | 7/1974 | Schneider | 403/295 |

FOREIGN PATENT DOCUMENTS

| | | | |
|---|---|---|---|
| 151139 | 4/1953 | Australia | 403/297 |
| 1373517 | 8/1964 | France | 403/297 |
| 451604 | 5/1968 | Switzerland | 403/297 |

*Primary Examiner*—Andrew V. Kundrat
*Attorney, Agent, or Firm*—Lahive & Cockfield

[57] ABSTRACT

A connector for tubular sections has two elements separable by threaded screws for engaging the interior walls of the tubular sections. The screws are threaded into connectors on one element, and have affixed nuts that engage the other element from inside to separate the elements. One screw has a recessed head so that a tubular section may slide over it. The other projects, to locate the coupling in one of the tubular sections. The projecting screw is located near an end of the coupling element, allowing the other end to be pivotally narrowed for mounting of a tubular section.

7 Claims, 8 Drawing Figures

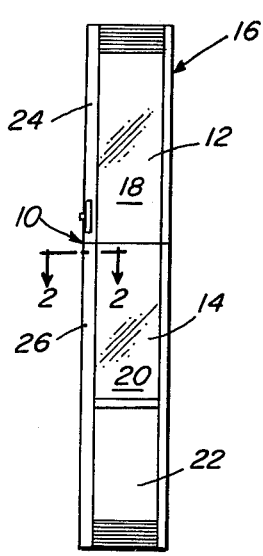
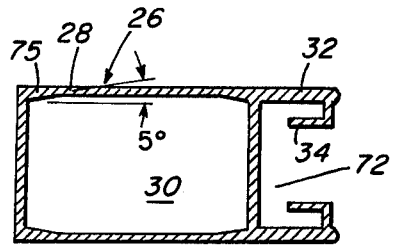
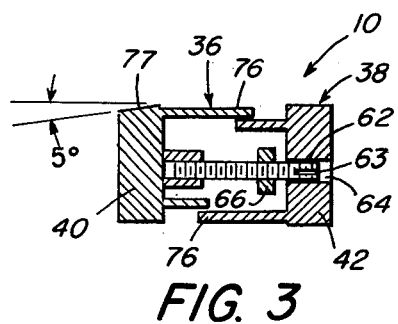
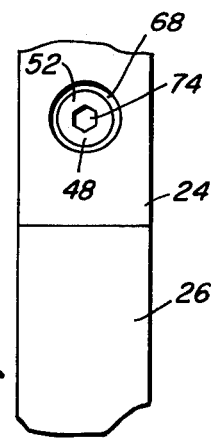
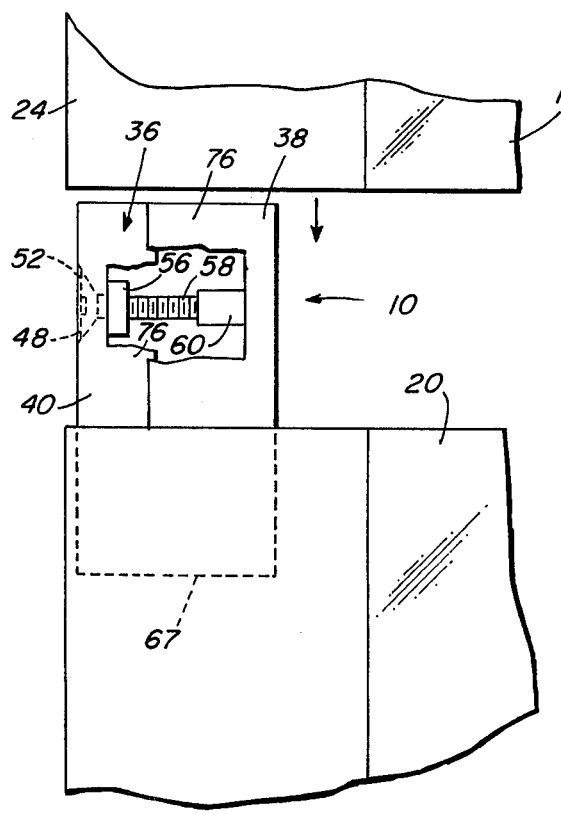
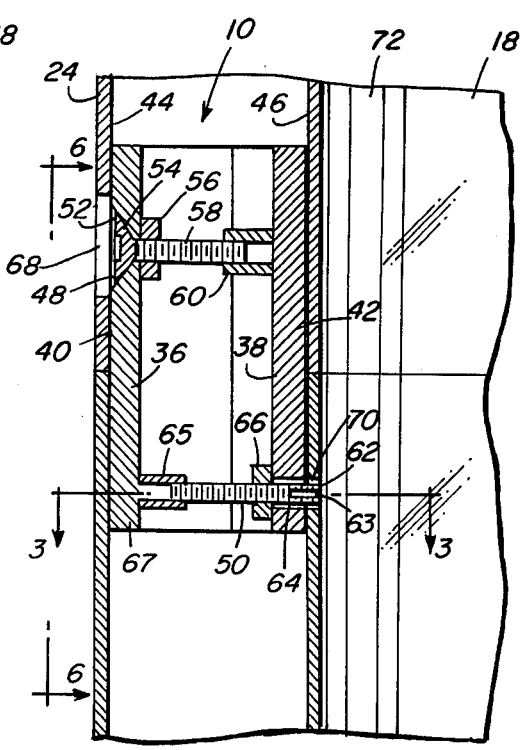

TUBING COUPLING

BACKGROUND

This invention relates generally to couplings for tubing and particularly to couplings made of elements that press against the interior walls of tubing sections in order to keep them coupled.

It is frequently desirable to couple tubular sections with an internal element that keeps the exterior of the tubular sections free of protruding fittings. One approach is to have two separable elements that span the sections to be joined. The elements are arranged to engage the interior walls of the sections by the action of threaded members that force the separable elements apart. Such couplings are shown, for example, in U.S. Pat. application Nos. 2,850,304 and 3,484,830. The couplings are sometimes difficult to use and install, however. The components of the coupling may also move relative to each other during installation. The location of the coupling itself within the tubing may become indeterminate.

It is an object of this invention to provide a coupling for tubing sections that is easy to use and locate in the tubing sections. It is another object to provide a coupling that has one end for semi-permanent installation in one tubing section and another end for easy use so that the tubing sections can be assembled and dissassembled rapidly.

SUMMARY

The connector for tubular pieces of the invention comprises a pair of opposite longitudinal separable elements, each element having an exterior portion adapted to engage the interior walls of the tubular pieces. The connector includes a first threaded means and a second threaded means, each threadedly connected to one of the elements and having an affixed collar for engaging an interior surface of the other of the elements, for separating the elements and thereby placing the wall engaging portions into pressing engagement with the interior walls. The separable elements are pivotable about one of the threaded means in response to threading of the other of the threaded means.

In preferred embodiments one of the threaded means is located near one end of the separable elements to allow freer pivotable movement of the other end. Also, one of the threaded means has an extended portion adapted to project outwardly beyond the separable element when the collar has engaged the interior surface of the element. The other threaded means has an exterior engaging means adapted to engage an exterior surface of the other element for urging the elements together, the element defining a recess for receiving the exterior engaging means. Furthermore, the separable elements have tapered corners for engaging tubular piece walls of tubular pieces with substantially rectangular cross section.

BRIEF DESCRIPTION OF THE DRAWINGS

Other objects, features and advantages of the invention will be mentioned, or will be inherently disclosed, in the following descriptions of preferred embodiments of the invention, including the drawing thereof, in which:

FIG. 1 shows a sliding door panel with rectangular tubular frame members in which the coupling of the invention is used;

FIG. 2 is a cross-sectional view of a tubular frame member of the panel;

FIG. 3 is a cross-sectional view of the coupling of FIG. 1 showing the locating screw, along the lines 3—3 of FIG. 5;

FIG. 4 is an elevation of the coupling of FIG. 1 located in one tubing section ready for the addition of the second tubing section, with portions broken away;

FIG. 5 a sectional elevation of the coupling of FIG. 1 holding the two tubing sections together;

FIG. 6 is an end view of the coupled tubular frames, showing the release screw;

DESCRIPTION OF A PREFERRED EMBODIMENT

Figure 8:
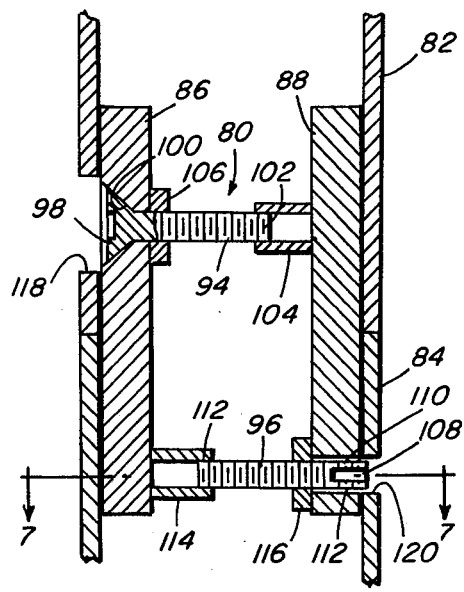
FIG. 8 is a sectional elevation of the coupling of FIG. 7 holding the two tubing sections together.

The coupling 10 illustrating the invention in the first preferred embodiment, as shown in FIGS. 1-6, is used to join top and bottom parts 12 and 14 of a panel 16 meant for insertion in the frame (not shown) for sliding doors in residences. The panel 16 includes glass upper and lower sections 18 and 20, and a bottom pet access door 22. The panel top and bottom parts 12 and 14 have tubular frame members framing the panel. The coupling 10 is used to couple upper frame member tubing 24 and lower frame member tubing 26.

FIG. 2 is a cross-sectional view of the lower tubing 26, showing how it has a generally rectangular wall 28 surrounding an interior space 30. Extending from the rectangular wall 28 are two parallel walls 32 with inwardly extending walls 34 for gripping the glass sections 18 and 20.

The coupling 10 in the illustrative embodiment is used to firmly join the top and bottom parts 12 and 14 of the panel 16 by coupling the upper and lower tubing 24 and 26. The coupling 10 (see FIGS. 3, 4, and 5) includes two longitudinal, separable elements 36 and 38. Each of the elements 36 and 38 has an exterior wall 40 and 42, respectively, for engaging an interior wall 44 and 46, respectively, of the tubular sections 24 and 26. The upper and lower tubings 24 and 26 are held together by the frictional engagement of the tubing inside walls 44, 46 by the coupling element walls 40, 42 that each extend into both upper and lower tubing 24, 26.

The frictional engagement is created by upper and lower threaded screws 48 and 50, respectively. The upper, or release, screw 48 has a head 52 adapted to fit a recess, or countersunk hole, 54 and engage the outside of one of the walls 40, and a nut 56 glued to the screw 48 for engaging the inside of the wall 40. The threaded portion 58 of the screw 48 extends to a threaded fitting 60 mounted on the wall 42 of the opposite element 38.

The lower locating screw 50 has no head, and is adapted to pass through hole 64 in the other wall 42. The screw 50 has a nut 66 glued to the screw 50 for engaging the inside of the wall 42. The threaded portion of the lower locating screw 50 extends to a threaded fitting 65, mounted on the wall 40 of the opposite element 36. The outer end 62 of the lower screw 50 has a six-sided hole 63 for insertion of a key (not shown) to turn the screw. The affixed nut 66 is spaced from the end of the screw 50 so that when the nut 66 engages the wall 42, the end 62 extends beyond the wall 42.

The lower locating screw 50 is positioned near the edge 67 of the coupling 10, so that when the coupling elements 36 and 38 pivot during adjustment of the coupling, the inward range of movement of the upper portions of the elements 36 and 38 will not be limited by how far the portions of the elements 36 and 38 below the locating screw 50 may pivot outward.

The upper and lower tubing 24 and 26 have holes 68 and 70 corresponding to the positions of the upper and lower screws 48 and 50. When the coupling 10 is inserted in the lower tubing 26, the locating screw end 62 protrudes into the hole 70 in the wall 28 of the tubing, locating the coupling 10 at a correct position longitudinally. The locating screw end 62 and the hole 70 are on the inside track 72 of the panel 16 where the screw end 62 is hidden from view and inaccessible because of the later installation of the bottom glass section 20.

The use of the coupling 10 is made by installing the coupling 10, semi-permanently, in the lower tubing 26. Turning the screw 50 causes the nut 66 of the lower locating screw 50 to engage the inside of the wall 42 of the element 38 so that the wall 42, in turn, engages the wall 46 of the tubing 26. The screw end 62 protrudes into the inside track 72. The bottom glass section 20 is installed into the bottom part 14, eliminating access to the screw end 62.

The upper glass section 18 is installed into the top part 12 of the panel 16. The upper and lower parts 12, 14 of the panel 16 may then be shipped as separate pieces. When it is desired to assemble the panel 16, the assembler tightens the upper release screw 48, so that the screw head 52 engages the outside of the wall 40, bringing together the upper portions of the separable elements 36, 38 of the coupling 10. The upper portions pivot inwardly about the fulcrum provided by the elements of the lower locating screw 50, making sliding the upper tubing 24 onto the coupling 10 easier. The upper engaging head 52 is seated in the countersunk hole 54 in the element wall 40, below the surface of the wall 40.

After the upper tubing 24 is slid onto the coupling 10 (see FIG. 4), the upper screw head 52 (see FIG. 6) is accessible through the upper tubing hole 68. The head 52 may be manipulated then by an appropriate tool. In the illustrative embodiment a key (not shown) is inserted into a six-sided hole 74 in the head 52, and the upper screw 48 is turned to bring the affixed nut 56 into engagement with the inside of the element, to press the wall 40 into engagement with wall 44 of the upper tubing 24. The wall 42 of the other element 38 is simultaneously engaging wall 46 of the tubing 24.

To assist the alignment of the upper and lower tubing 24 and 26, the corners 75 of the inside walls are tapered at an angle of about 5° (see FIG. 2). and the outside corners 77 of the coupling are tapered at a corresponding angle (see FIG. 3), so that as the coupling elements 36 and 38 engage the walls 44, 46 of the tubing, the corners 75 engage the tubing walls transverse to the engaged walls 44, 46 to firmly align the tubing sections 24 and 26.

Since the panel of the illustrative embodiment is a portion of a door when it is installed, the coupling 10 includes light shields 76 extending inwardly, and overlapping, from each element 36, 38. No light may therefore be seen through the joint made by the coupling 10, minimizing the risk that an intruder will be made aware of the joint and attack it as a way of forcing the door panel 16 apart.

Figure 7:
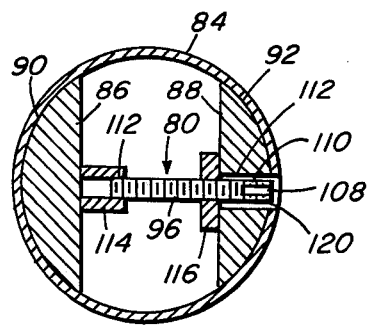
FIG. 7 is a cross-sectional view of another embodiment of the coupling joining circular tubular frame members.

FIGS. 7 and 8 show a second embodiment of the invention, a coupling 80 for use with upper 82 and lower 84 tubing sections of circular cross-section. The separable elements 86 and 88 of the coupling 80 in this embodiment have outside walls 90 and 92, respectively, that are curved to match the curvature of the upper and lower tubing sections 82, 84.

Otherwise, the coupling 80 of this second embodiment is like the coupling 10 of the first embodiment. The coupling 80 includes an upper release screw 94 and a lower locating screw 96. The upper release screw 94 has a head 98 that seats in a countersunk hole 100 in coupling element 86 and a threaded section 102 that extends into a threaded fitting 104 mounted on the opposite coupling element 88. A nut 106 glued on the threaded section 102 inside the element 86 will engage the element 86 and cause the elements 86 and 88 to engage the inside walls of the tubing sections 82, 84 when the screw 94 is turned one way. Turning the screw 94 the other way will cause the screw head 98 to push together the coupling elements 86 and 88, out of engagement with the tubing sections 82 and 84.

The lower locating screw 96 has no head, but has a six-sided hole 108 in a screw end 110 that passes through a hole 112 in coupling element 88. The lower screw 96 has a threaded portion 112 that extends into a threaded fitting 114 mounted on the opposite coupling element 86. Because the lower screw 96 has no head and the screw end 110 passes through the hole 112, tightening the screw 96 will not cause movement together of the coupling-elements 86 and 88. But a nut 116 glued on the threaded portion 112 will force apart elements 86 and 88 when the screw 96 is loosened, causing the elements 86 and 88 to engage the inside walls of the tubing sections 82, 84, in the vicinity of the lower screw 96.

The upper screw head 98 is accessible through a hole 118 in the upper tubing section 82; the lower screw end 110 is accessible through a hole 120 in the lower tubing section 84. The lower screw end 110 is adapted to project into the hole 120 when the coupling 80 is engaged, to locate the coupling longitudinally; the upper screw head 98 is adapted to be below the level of the surface of coupling element 82 so that the upper tubing section 82 can be slid over the coupling 80 during assembly.

The embodiments of the coupling described are illustrative of the invention only, the scope of the invention being defined by the following claims.

What is claimed is:

1. A connector for tubular pieces comprising:
   a pair of opposite longitudinal separable elements,
   each said element having an exterior portion adapted to engage the interior walls of said tubular pieces,
   first threaded means threadedly connected to one of said elements and having an affixed collar adapted to engage an interior surface of the other of said elements for separating said elements and thereby placing said wall engaging portions into pressing engagement with said interior walls,
   second threaded means longitudinally spaced from said first means, also threadedly connected to one of said elements and having an affixed collar adapted to engage an interior surface of the other of said elements for separating said elements and thereby placing said wall engaging portions into pressing engagement with said interior walls, said separable elements being pivotable about one of said threaded means in response to threading of the other of said threaded means.

2. The connector of claim 1 wherein one of said first and second threaded means is located near one end of said separable elements whereby freer pivotable movement of the other end may be obtained.

3. The connector of claim 1 wherein one of said first and second threaded means includes an element engagement assembly comprising engaging means, comprising said affixed collar, located interiorly of said separable element to urge said element outwardly when said threaded means is turned in one direction, and an extended portion adapted to project outwardly beyond said separable element when said engaging means has engaged said interior surface of said element.

4. The connector of claim 1 wherein said separable elements have tapered corners for engaging tubular piece walls of tubular pieces with substantially rectangular cross section.

5. The connector of claim 1 wherein one of said first and second threaded means includes an element engagement assembly comprising first engaging means, comprising said affixed collar, located interiorly of said separable element to urge said element outwardly when said threaded means is turned in one direction, and second engaging means located exteriorly of said separable element to urge said element inwardly when said threaded means is turned in the other direction.

6. The connector of claim 5 wherein said separable element defines a recess for receiving said second, exteriorly located, engaging means of said element engagement assembly.

7. A connector for tubular pieces comprising:

a pair of opposite longitudinal separable elements, each said element having an exterior portion adapted to engage the interior walls of said tubular pieces, first threaded means threadedly connected to one of said elements and having an affixed collar adapted to engage an interior surface of the other of said elements for separating said elements and thereby placing said wall engaging portions into pressing engagement with said interior walls when said first threaded means is turned in one direction, and an exterior engaging means adapted to engage an exterior surface of the other of said elements for urging said elements together when said threaded means is turned in the other direction, said other element defining a recess for receiving said exterior engaging means, and second threaded means threadedly connected to one of said elements and having an affixed collar adapted to engage an interior surface of the other of said elements for separating said elements and thereby placing said wall engaging portions into pressing engagement with said interior walls when said second threaded means is turned in one direction, and an extended portion adapted to project outwardly beyond said separable element when said affixed collar has engaged said interior surface of said element.

* * * * *